United States Patent
Shigeta

(10) Patent No.: US 7,180,511 B2
(45) Date of Patent: Feb. 20, 2007

(54) DISPLAY CONTROL SYSTEM FOR DISPLAYING IMAGE INFORMATION ON MULTIPLE AREAS ON A DISPLAY SCREEN

(75) Inventor: Kazuyuki Shigeta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 317 days.

(21) Appl. No.: 09/873,293

(22) Filed: Jun. 5, 2001

(65) Prior Publication Data

US 2001/0050679 A1 Dec. 13, 2001

(30) Foreign Application Priority Data

Jun. 9, 2000 (JP) .............................. 2000/174169

(51) Int. Cl.
*G09G 5/00* (2006.01)
(52) U.S. Cl. ........................ 345/204; 345/1.1; 345/698; 345/564
(58) Field of Classification Search ................ 345/204, 345/581, 698, 1.1, 564, 565
See application file for complete search history.

(56) References Cited

U.S. PATENT DOCUMENTS

| | | | | |
|---|---|---|---|---|
| 5,367,318 A | * | 11/1994 | Beaudin et al. ............. | 345/536 |
| 6,014,383 A | | 1/2000 | McCarty ...................... | 370/453 |
| 6,018,332 A | * | 1/2000 | Nason et al. ................ | 345/127 |
| 6,049,316 A | * | 4/2000 | Nolan et al. ................. | 345/1.1 |
| 6,088,004 A | * | 7/2000 | Domae et al. ............... | 345/1.1 |
| 6,314,479 B1 | * | 11/2001 | Frederick .................... | 710/63 |
| 6,476,821 B2 | * | 11/2002 | Sawada et al. .............. | 345/620 |
| 6,600,747 B1 | * | 7/2003 | Sauber ................... | 370/395.64 |
| 6,618,773 B1 | * | 9/2003 | Chang et al. ................. | 710/16 |
| 6,674,436 B1 | * | 1/2004 | Dresevic et al. ............ | 345/472 |
| 6,720,970 B2 | * | 4/2004 | Nagoya ....................... | 345/581 |
| 6,762,770 B1 | * | 7/2004 | Opstad et al. ............... | 345/589 |

FOREIGN PATENT DOCUMENTS

JP 10-243020 9/1998

* cited by examiner

*Primary Examiner*—Richard Hjerpe
*Assistant Examiner*—Kimnhung Nguyen
(74) *Attorney, Agent, or Firm*—Fitzpatrick, Cella, Harper & Scinto

(57) ABSTRACT

A display control system includes multiple image signal sources and image display devices. At the time of performing control for displaying picture signals from the multiple signal sources connected on respective sending lines to respective multiple areas on screens of image display devices, image display attributes information for each display area is stored in a per-area display attributes information storing unit, and an identification number of input pictures is obtained by an input signal identification signal obtaining unit. Based on the obtained identification signals, display selection information for appropriating the picture signals to the multiple display areas is created at a display signal selecting unit. The stored image display attributes information and the created display selection information are notified to the multiple signal sources connected to the respective sending lines.

22 Claims, 13 Drawing Sheets

FIG. 4

| RECIPIENT ADDRESS | ORIGINATOR ADDRESS | DISPLAY AREA ID | DISPLAY ATTRIBUTES INFORMATION | END OF DATA | |
|---|---|---|---|---|---|
| H1 a BYTES | H2 b BYTES | H3 c BYTES | H4 d BYTES | | H5 e BYTES CHECKSUM |

FIG. 5

| RECIPIENT ADDRESS | ORIGINATOR ADDRESS | DISPLAY AREA ID | IDENTIFICATION SIGNAL FOR APPROPRIATE INPUT SIGNALS | END OF DATA | |
|---|---|---|---|---|---|
| H1 a BYTES | H2 b BYTES | H3 c BYTES | H6 f BYTES | | H5 e BYTES CHECKSUM |

FIG. 7

| DISPLAY AREA | F2 | F3 | F4 |
|---|---|---|---|
| PER-AREA DISPLAY ATTRIBUTES | RESOLUTION : QXGA<br>GRADIENTS : 8-BIT | RESOLUTION : XGA<br>GRADIENTS : 8-BIT | RESOLUTION : SDTV<br>GRADIENTS : 8-BIT |
| ATTRIBUTED SIGNAL SOURCE | PC1 | PC2 | DVD |
| INPUT IDENTIFICATION SIGNAL | COMMUNICATION ADDRESS FOR PC1 | IDENTIFICATION ID OF OUTPUT SIGNAL OF PC2 | COMMUNICATION ADDRESS FOR DVD |

FIG. 9

| DISPLAY AREA | F2 | F3 | F4 |
|---|---|---|---|
| PER-AREA DISPLAY ATTRIBUTES | RESOLUTION : QXGA<br>GRADIENTS : 8-BIT | RESOLUTION : XGA<br>GRADIENTS : 8-BIT | RESOLUTION : HDTV<br>GRADIENTS : 8-BIT |
| ATTRIBUTED SIGNAL SOURCE | PC1 | PC2 | DVD |
| INPUT IDENTIFICATION SIGNAL | COMMUNICATION ADDRESS FOR PC1 | IDENTIFICATION ID OF OUTPUT SIGNAL OF PC2 | COMMUNICATION ADDRESS FOR DVD |

DISPLAY CONTROL SYSTEM FOR DISPLAYING IMAGE INFORMATION ON MULTIPLE AREAS ON A DISPLAY SCREEN

BACKGROUND OF THE INVENTION

1. Field of the Invention

The present invention relates to a display control system which displays multiple areas on a display screen and which displays picture signals from different signal sources in the respective areas, and to a display control method.

2. Description of the Related Art

Heretofore, advances in communication technology have led to advances in networking in the office place, such that various types of equipment are connected to personal computers, with the functions thereof being shared. In recent years, standardization for communications between home appliances, such as HAVi or Jini, has advanced with interfaces such as IEEE1394 and USB, and, accordingly, networking of equipment within the home is also advancing.

On the other hand, television sets and personal computer displays had been entirely separate entities, but these have merged to where there are television sets capable of displaying personal computer screens, and personal computer displays capable of inputting television signals.

Further, with wide-screen televisions, plasma displays, rear-projection televisions, projectors, and other like large-screen display devices, there are increasingly more opportunities in both office and home for use associated with various picture sources, such as for movies, television, home videos, presentations, tele-conferencing, displaying various types of information, and so forth. As such, there is demand for display devices to have multi-screen display functions wherein one screen is divided into multiple screens for displaying images of different image signal sources.

FIG. 13 is a block diagram illustrating a configuration of a display device for a personal computer, as an example of a commonly-used conventional display device. In the figure, reference numeral 301 denotes a personal computer serving as an image signal source. Reference numeral 315 denotes a personal computer display device serving as a display device. Here, a display device for sending image signals as digital data is shown.

Looking at the image signal source 301, reference numeral 302 denotes a CPU (Central Processing Unit), 303 denotes a bus control unit for sending control signals from the CPU 302 to components of the image signal source 301, 311a is a system bus line made up of a data bus and control bus connecting the components, and 311b denotes a bus line between the CPU 302 and the bus control unit 303.

Reference numeral 304 denotes a main memory, 305 denotes a recording medium such as a hard disk or the like, and 306 denotes a graphics drawing unit for creating image signals for display, which are output according to output image attributes (resolution, pixel frequency, screen refresh frequency, gamma properties, gradients, color properties, etc.) for the display device 315.

Reference numeral 307 denotes image memory used by the graphics drawing unit 306 when processing images, 311e denotes a data bus and a control bus between the graphics drawing unit 306 and the image memory 307, and 308 denotes an image transmitting unit for sending image signals created by the graphics drawing unit 306 to the display device 315. Specifically, this is a TMDS sending device using DVI (Digital Video Interface) standards established by DDWG (Digital Display Working Group) which is a display device standardization group, or a sending device that compresses images or only sends partially rewritten portions.

Reference numerals 309 and 310 denote portions for performing communication between the display device 315 and the image signal source 301 (personal computer). Here, there is a standard for communication between display devices and personal computers, called DDC (Display Data Channel) communication. DDC is a standard for performing an exchange such that a computer can recognize and control a display device, and is recommended by VESA (Video Electronic Standard Association), which is a display-related standardization group.

Based on this communication method, EDID (Extended Display Identification Data) format (also standardized by VESA) display attributes information is sent from the display device side to the personal computer side. This was issued as a standard in Extended Display Identification Data Standard version 3 (Revision Date: Nov. 13, 1997).

The DVI standards also use this DDC communication to perform communication between display devices and personal computers, and also specifies hot-plug functions (functions for detecting connection with a personal computer and performing DDC communication). Reference numeral 310 denotes a DDC communication unit for performing this DDC communication, and 309 denotes a connection detecting unit for realizing the hot-plug functions.

The connection detecting unit 309 is connected to the ground or the power source through resistance when not connected to the display device 315, for example, and connection thereof causes the ground potential or power source potential to change, thereby detecting connection of a display. Reference numeral 311c denotes a line group for sending signals from the connection detecting unit 309 and the DDC communication unit 310 to the graphics drawing unit 306. Control between the connection detection unit 309 and the DDC communicating unit 310 is controlled by the CPU 302.

In at the display device 315, reference numeral 317 denotes a micro-computer unit for controlling the display device. Reference numeral 325a denotes a line group made up of a control bus from the micro-computer unit 317, 318 denotes an image receiving unit for receiving picture images such as TMDS standard signals or the like sent from the image transmitting unit 308 and for converting the signals into a format suitable for signal processing, such as RGB 8-bit signals, and 319 denotes a resolution converting unit for performing a conversion, such as resolution conversion or image-refreshing frequency conversion, for matching the number of pixels of the image from the image signal source 301 (personal computer) to the display pixel number of the display device 315.

Reference numeral 320 denotes an image memory, 325e denotes a data bus and a control bus for the image memory, and 321 denotes an image display processing unit for converting gamma properties, color properties, etc., to match the properties of a liquid crystal or CRT image display unit, and for performing text display such as on-screen display. Reference numeral 322 denotes an image display unit made up of devices such as liquid crystal, CRT, PDP, EL, LED, or the like.

Reference numeral 324 denotes a DDC communication unit for performing DDC communication, 323 denotes a connection signal supplying unit for supplying a bias voltage or the like for providing a signal indicating that a connection has been made, and 325b through 325d are data buses for image signals.

Reference numerals 314a through 314c denote lines connecting the image signal source 301 (personal computer) and the display device 315, 314a is a line for image signals, 314b is a line for DDC communication, and 314c is a line for connection detection. Normally, 314a through 314c are batched as one dedicated image cable.

As shown in this example, conventional display devices for personal computers are connected to a personal computer for inputting the image on a one-to-one basis. The resolution of a displayed image accordingly is determined by transferring EDID data by DDC communication when starting up the image signal source 301 (personal computer) or performing connection detection of the display device 315.

Methods known for the image output device to obtain information on the display device include conventional exchange of EDID data by DDC communication (currently Ver. 3.0) and the HAVi (Home Audio/Video Interoperability) standard (currently Ver. 1.0), but both of these only assume communication of full display-area information (number of display pixels, aspect ratio, MPEG compression format transfer, and so forth).

Accordingly, when transferring multiple picture signals to an arbitrary screen display area of the display device, output from picture signal sources must be sent as the same signal as for the entire display area, even when the display device is a picture-in-picture display device. This risks exceeding the upper limit of the amount of information a transfer path can carry of picture signals.

Also, with DDC communication, the EDID information is one-way from the display device to the signal source, and due to the fact that the display device cannot accurately grasp the resolution of image signals to be input, and that the time for performing communication is limited to the time of starting up the personal computer or the time of physically connecting the display device and the signal source, there is no way to perform communications for changing image attributes (display area and resolution, compression percentage, sending format, etc.) and audio information or controlling the amount of information (selection information, stopping, starting, changing compression percentage, etc.), while displaying an image.

Further, simply obtaining the picture signals, which the signal source itself outputs, makes the amount of image information for multiple signals sources mutually unclear. Therefore, even in cases where there is the problem in which the total amount of image signal data being input to the input system of a display device exceeds its capacity, detection of the problem and reduction in the amount of information by mutual control cannot be performed.

Japanese Patent Laid-Open No. 10-234020 discloses a communication method for reducing the amount of data transferred at the sending side, when exchanging images among multiple devices, but the method assumes specialized exchange devices and is not capable of managing the amount of image information in environments wherein different devices have been connected.

FIG. 14 is a block diagram illustrating a connection form of various pieces of equipment according to a home appliance communication standard such as HAVi or Jini, which are currently in the processes of standardization. In the figure, reference numerals 401 and 413 denote digital televisions (DTV_A and DTV_B) capable of receiving digital broadcast. Now, the digital television 401 is connected to a network interface, such as IEEE1394, via a set-up box 402, and connected to the set-up box 402 via an image-dedicated cable 419, such as a D-terminal cable.

The digital television 413 has an IEEE1394 decoder built in, and accordingly is directly connected to the network. Reference numeral 404 denotes a personal computer (PC_A), 403 denotes a display device thereof (PC Display_A), and 418a denotes a dedicated image cable thereof. The configuration of the PC_A 404, the display device 403, and the dedicated image cable 418a, corresponds to that shown in FIG. 13. Also, in the same manner, reference numeral 410 denotes a personal computer (PC_B), 409 denotes a display device thereof (PC Display_B), and 418b denotes a dedicated image cable thereof.

Now, the PC_A 404 and the PC_B 410 are connected to the IEEE1394 network, which is not used for sending image signals to the display device, but instead is used for sending other signals.

Reference numeral 405 denotes a digital television tuner (DTV TUNER) of a different system, 406 denotes a digital video (DV), 411 denotes a DVD disk player (DVD), and 412 denotes a server comprised of a hard disk drive (HDD) for recording programs.

These audio-visual devices are connected to the IEEE1394 network, and thus exchange image information. Reference numeral 414 denotes a modem connected to a public network, 416 denotes a telephone line or the like connected to the public network, 407 and 408 denote hubs for dividing and connecting IEEE1394 signals, and 417a and 417j denote IEEE1394 standard communication lines.

With in-home networks thus connected, the user can realize an environment wherein various sources (DTV TUNER, DV, DVD, and HDD)can be operated remotely from the televisions 401 and 413.

However, with conventional in-home networks, a personal computer is connected to a dedicated display in a one-on-one manner, and accordingly personal computer images cannot be referenced via the network by a digital television, as with the other audio-visual equipment.

Also, dedicated cables have been relatively heavy and the sending distance thereof limited, so the personal computer and the display had to be positioned close to one another. This is due to the following reasons.

As a first reason, with a current display device sending method, sending different image signals over the same line results in exceeding the transfer speed limit. For example, in the case of XGA resolution (1024 pixels×768 pixels, 60 Hz refresh cycle, and 65 MHz pixel frequency, 8-bit for each color), the information amount is 1060 Mbit/sec, so the transfer speed of personal computer image signals is greater than the 400 Mbit/sec transfer speed of a IEEE1394 network. Accordingly, there is a need to use dedicated cables for performing specialized sending by TMDS or the like. This data amount can be reduced by performing image compression, but the problem of the excessive information amount on the network remains.

Performing image compression, such as that according to MPEG standards or partial rewriting, may enable a particular piece of information to be sendable as far as the amount of information thereof is concerned, but in the event that this information is to be referenced from an arbitrary location on an in-home network, multiple signals are sent over the same line, so there is the possibility that the transfer speed capacity may be exceeded.

Particularly, in the event of displaying multiple images with a multi-screen display, the number of image signals occupying the line increases, to the extent that the above problem can occur not only for personal computers but also with digital televisions, and digital television arrangements are being developed assuming that signals will be sent over current networks.

As a second reason, the basic concept for determining resolution between current personal computers and display devices assumes a one-on-one arrangement, and does not take into consideration multiple-to-multiple systems unique to networks.

EDID data serving as display attributes information to be transferred from the display device to the personal computer by DDC communication only indicates a list of resolutions of which display can be made, as stated in Extended Display Identification Data Standard Version 3, with the arrangement being such that the actual resolution is selected by the graphics drawing unit of the personal computer that makes reference thereto, and output signals of resolution matching the display device are outputted single-directionally.

Accordingly, displays merely infer from which personal computer signals have been sent by judging the resolution of the sent image signals.

Accordingly, even in the event that there is a problem wherein information signals with large information amounts are sent from multiple information sources, exceeding the processing capacity of the sending line and the display device such that a correct display cannot be carried out, the problem cannot be dealt with from the display device.

Also, the signal source side, such as a personal computer which originally is acting as a host computer, can determine the display capabilities of the display device connected to the signal source, but is not of a configuration to determine the amount of information of other signal sources connected to the display device, and accordingly is not capable of preventing such problems in a system.

SUMMARY OF THE INVENTION

Accordingly, it is an object of the present invention to provide a display control device, a display control system, a display control method, and a recording medium, which allow a signal source side to transmit information limited to an amount for necessary image areas, thereby reducing the amount of information on a network.

It is another object of the present invention to provide a display control device, a display control system, a display control method, and a recording medium, which allows a signal source side to or an arbitrary device on a network to determine which signal source's images are currently being displayed at an arbitrary display area of an arbitrary display device.

To this end, according to a first aspect of the present invention, a display control device for controlling display of picture signals from a plurality of signal sources connected to signal sending lines on a plurality of display areas on a screen comprises: attributes information storing means for storing display attributes information for each of the display areas; and notification means for notifying the plurality of signal sources connected to the signal sending lines of the stored display attributes information.

Also, according to a second aspect of the present invention, a display control device for controlling display of picture signals from a plurality of signal sources connected to signal sending lines on a plurality of display areas on a screen, comprises: obtaining means for obtaining identification signals relating to picture signals from the plurality of signals sources; display selection information creating means for creating display selection information based on the obtained identification signals; display selecting means for appropriating the picture signals to the plurality of display areas according to the created display selection information; and notification means for notifying the plurality of signal sources connected to the signal sending lines of the created display selection information.

Also, according to a third aspect of the present invention, with a display control device for controlling display of picture signals from a plurality of signal sources connected to signal sending lines on a plurality of display areas on a screen with a display control device, the display control device comprises: attributes information storing means for storing display attributes information for each of the display areas; obtaining means for obtaining identification signals relating to picture signals from the plurality of signals sources; display selection information creating means for creating display selection information based on the obtained identification signals; display selecting means for appropriating the picture signals to the plurality of display areas according to the created display selection information; and notification means for notifying the plurality of signal sources connected to the signal sending lines of the stored display attributes information and the created display selection information, wherein the plurality of signal sources comprises transmitting means for transmitting picture signals corresponding to the plurality of display areas, based on the notified display attributes information and the display selection information.

Also, according to a fourth aspect of the present invention, a display control method for controlling display of picture signals from a plurality of signal sources connected to signal sending lines on a plurality of display areas on a screen of a display control device comprises the following steps executed at the display control device: a step for storing display attributes information for each of the plurality of display areas; a step for obtaining identification signals relating to picture signals from the plurality of signals sources; a step for creating display selection information based on the obtained identification information; a step for appropriating the picture signals to the plurality of display areas according to the created display selection information; and a step for notifying the plurality of signal sources connected to the signal sending lines of the stored display attributes information and the created display selection information, and the following step executed at the plurality of signal sources: a step for transmitting picture signals corresponding to the plurality of display areas, based on the notified display attributes information and the display selection information.

Further objects, features and advantages of the present invention will become apparent from the following description of the preferred embodiments with reference to the attached drawings.

BRIEF DESCRIPTION OF THE DRAWINGS

FIG. 4 is a diagram illustrating the communication format of display attributes information for each area;

FIG. 5 is a diagram illustrating the communication format of display signal selection information;

FIG. 7 is a table illustrating display attributes, signal source, and input identification signals for each display area;

FIG. 9 is a table illustrating display attributes, signal source, and input identification signals for each display area;

DESCRIPTION OF THE PREFERRED EMBODIMENTS

The following is a description of embodiments of the present invention, with reference to the drawings.

(First Embodiment)

Figure 1:
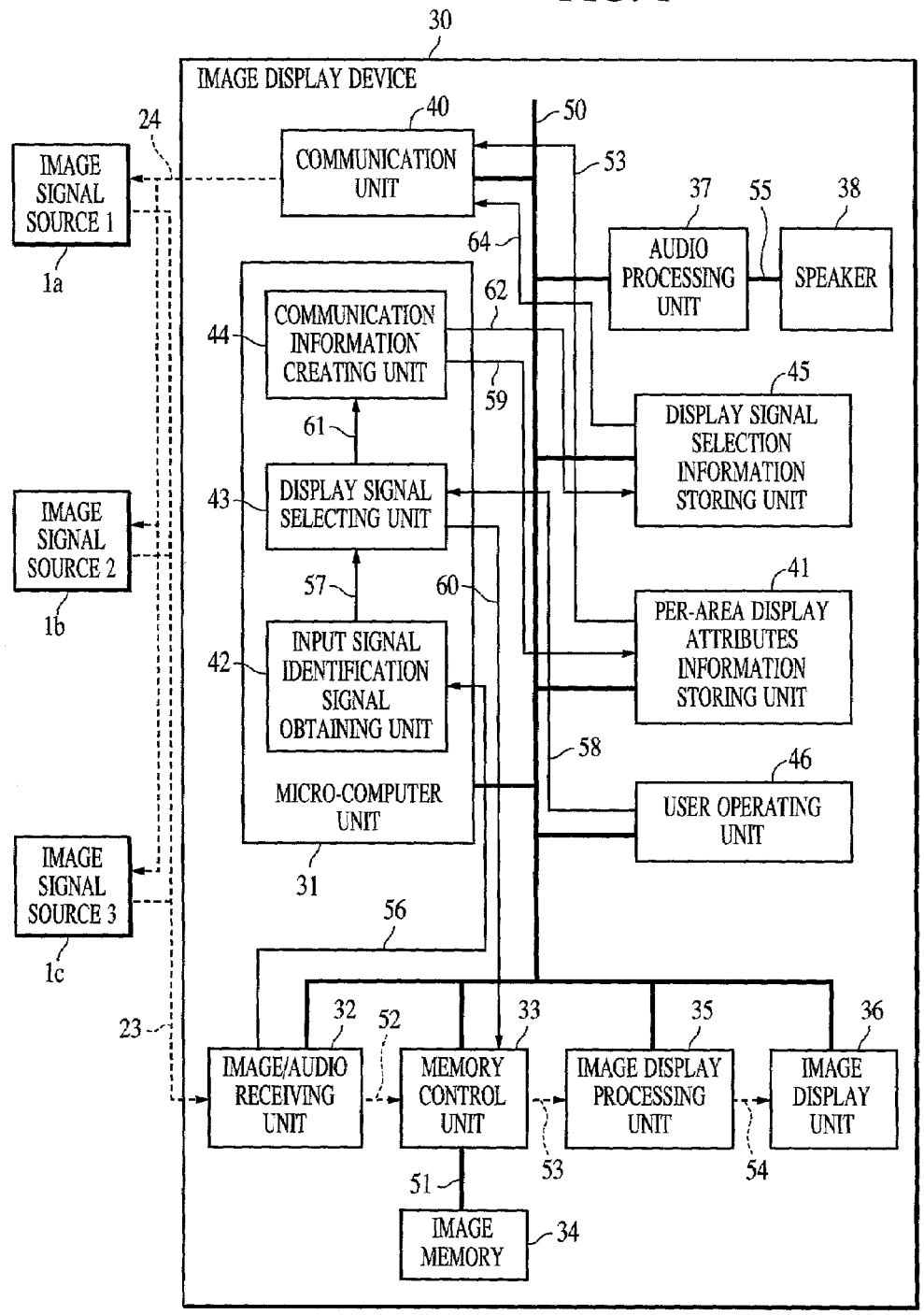
FIG. 1 is a block diagram illustrating a configuration of a display device connected to multiple image signal sources.
Figure 2:
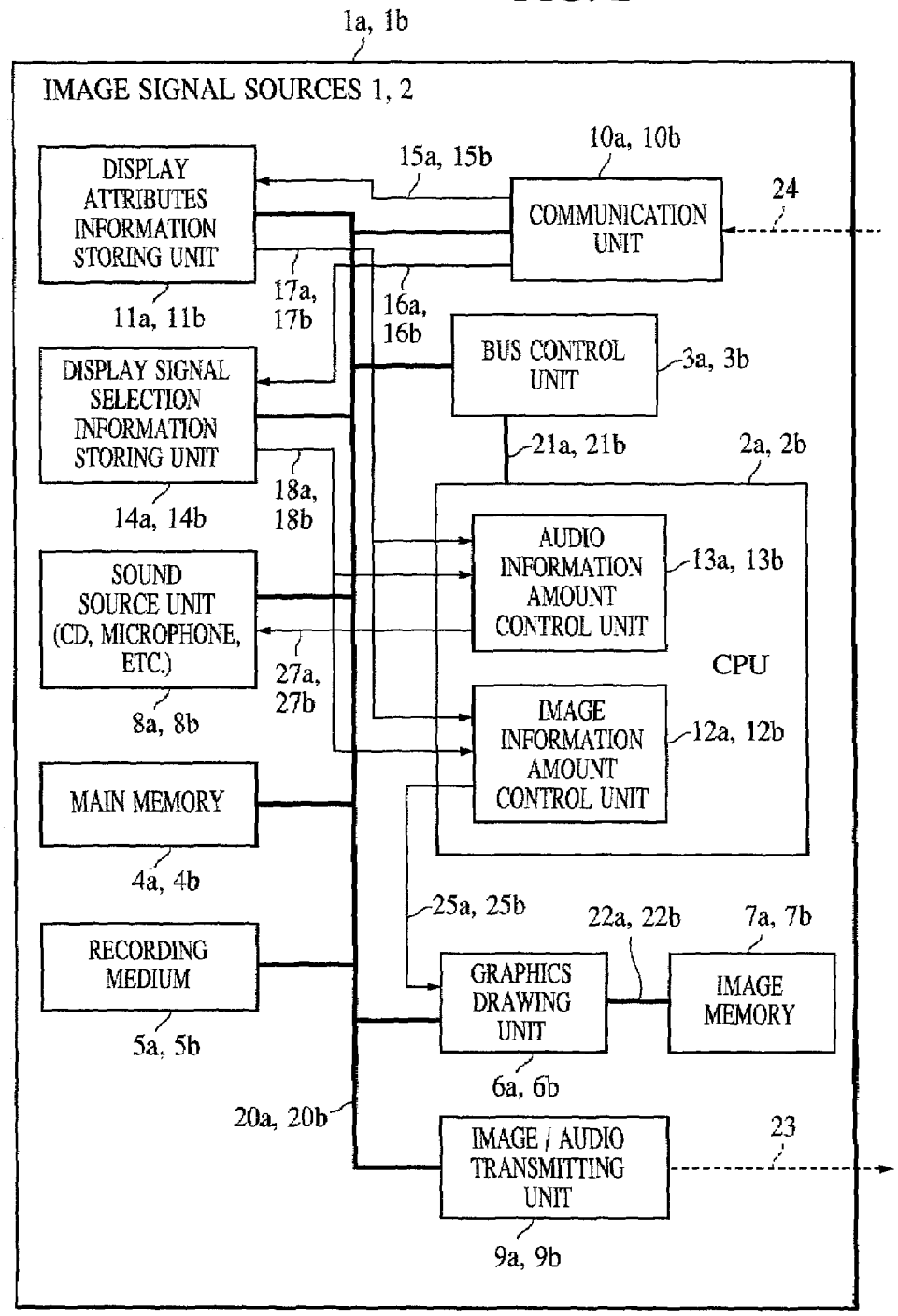
FIG. 2 is a block diagram illustrating a configuration of image signal sources.

FIG. 1 is a block diagram illustrating a configuration of a display device connected to multiple image signal sources. FIG. 2 is a block diagram illustrating a configuration of image signal sources. In the figures, reference numerals 1a, 1b, and 1c denote the image output devices (e.g., personal computers) serving as three image signal sources 1, 2, and 3, which have the same configuration in the present embodiment. Note that the configuration of the components shown in FIG. 2 is the same for the image signal source 3 (1c) as well.

On the other hand, reference numeral 30 denotes an image display device (e.g., a display device for a personal computer). With the present embodiment, a display device which receives image signals and audio signals by digital signals is used.

With the image output devices 1a and 1b shown in FIG. 2, 2a and 2b respectively denote CPUs (Central Processing Units), and 3a and 3b respectively denote bus control units for sending the control signals of the CPUs 2a and 2b to the components and also for controlling the overall data busses and the control busses.

Reference numerals 20a and 20b denote system bus lines comprising data busses connecting the components, and control busses, 21a and 21b denote bus lines connecting between the CPU 2a and the bus control unit 3a, and between the CPU 2b and the bus control unit 3b, respectively. Reference numerals 4a and 4b respectively denote main memories of the personal computers, 5a and 5b denote recording media such as hard disks or flash memory, and 6a and 6b denote graphics drawing units for creating image signals for the display devices. With the present embodiment, output matching the output image attributes of the display device (resolution, pixel frequency, image refresh frequency, gamma properties, gradients, color properties, etc.) is performed.

Reference numerals 7a and 7b denote image memories used for image processing at the graphics drawing units 6a and 6b, respectively, 22a and 22b denote data busses and control busses connecting the graphics drawing units 6a and 6b and the image memories 7a and 7b, respectively, 8a and 8b denote audio source units for creating audio signals from recording media such as CDs or microphones, and 9a and 9b denote image/audio sending units for sending image signals created with the graphics drawing units 6a and 6b and audio signals created with the audio source units 8a and 8b to the display device. This is equivalent to the part for performing conversion into TMDS (Transition Minimized Differential Signaling) signals or MPEG signals, the part for performing conversion into IEEE1394 signals and performing communication, and so forth. Also, compression conversion and conversion to partially rewritten signals is performed at the image/audio sending units 9a and 9b.

Reference numeral 23 denotes an image signal and audio signal sending line between the image signal sources and the display device, and 24 denotes a sending line for control signals between the personal computers and the display device.

Also, 10a, 11a, 12a, 13a, and 14a, and 10b, 11b, 12b, 13b, and 14b, are parts for performing communication with the display device. Reference numerals 10a and 10b denote communication units, for receiving display attributes information for each display area and display signal selection information, along with image attributes information such as EDID information and error signals. Reference numerals 11a and 11b denote display attributes information storing units for each display area, and are parts for storing the EDID information of the display device and the display attributes information for each of the display areas.

Reference numerals 14a and 14b denote display signal selection information storing units for the display signal selection information received from the display devices. Reference numerals 12a and 12b denote image information amount control units, which are parts for receiving the display attributes information for each of the display areas received from the display device and the display signal selection information thereof, and for controlling the graphics drawing units 6a and 6b. Reference numerals 13a and 13b denote audio information amount control units, which are parts for receiving the display attributes information for each of the display areas received from the display device and the display signal selection information thereof, and for controlling the audio source units 8a and 8b. Note that the image information amount control units 12a and 12b and the audio information amount control units 13a and 13b denote functions realized within the CPUs.

Reference numerals 15a and 15b denote the flow of display attributes information for each display area of the signals sources received by the communication units 10a and 10b, to the display attributes information storing units 11a and 11b. Reference numerals 16a and 16b denote the flow of display signal selection information of the signals sources received by the communication units 10a and 10b, to the display signal selection information storing units 14a and 14b.

Reference numerals 17a and 17b denote the flow of display attributes information for each display area of the signals sources from the display attributes information storing units 11a and 11b to the image information amount control units 12a and 12b and to the audio information amount control units 13a and 13b, reference numerals 18a and 18b denote the flow of display signal selection information for the signals sources from the display signal selection information storing units 14*a* and 14*b* to the image information amount control units 12*a* and 12*b* and to the audio information amount control units 13*a* and 13*b*.

Reference numerals 25*a* and 25*b* denote the flow of information amount control signals from the image information amount control units 12*a* and 12*b* to the graphics drawing units 6*a* and 6*b*. Reference numerals 27*a* and 27*b* denote the flow of information amount control signals from the audio information amount control units 13*a* and 13*b* to the audio source units 8*a* and 8*b*.

On the other hand, at the image display device 30, reference numeral 31 denotes a micro-computer unit for controlling the image display device 30. Reference numeral 50 denotes a line group made up from the control bus and data bus from the micro-computer unit 31. Reference numeral 32 denotes an image/audio receiving unit for receiving image signals and audio signals sent from the image/audio sending units 9*a* and 9*b*, and also decoding TMDS or IEEE1394 format signals and expanding the compressed data.

Reference numeral 33 denotes a memory control unit for performing resolution conversion and conversion of image refreshing frequencies to match the number of pixels of the images from the image signal sources 1 and 2 to the number of display pixels of the display device. Reference numeral 34 denotes an image memory used for signal processing by the memory control unit 33, 51 denotes a line group made up of the data bus of the memory 34 and the control bus, and 35 denotes an image display processing unit for converting gamma properties and color properties and the like to match the properties of a liquid crystal display or a CRT used for an image display unit 36 and for performing character display such as on-screen display.

The image display unit 36 is configured of a device such as a liquid crystal device, a CRT device, a PDP device, an EL device, LED, etc., reference numerals 52, 53, and 54 denote image data busses, 37 denotes an audio processing unit for converting received audio signals for reproduction at a speaker 38 and for performing amplification, and 55 denotes a line between the audio processing unit 37 and the speaker 38. Reference numerals 40, 41, 42, 43, 44, and 45 denote parts relating to communication with the signal sources.

Reference numeral 40 denotes a communication unit, which transmits display attributes information for each display area and display signal selection information to the personal computer side, along with display attributes information of the display unit itself such as conventional EDID information, error signals, and so forth.

Reference numeral 41 denotes a per-area display attributes information storing unit for storing attributes information for each display area of the display device, and 42 denotes an input signal identification signal obtaining unit for performing detecting of identification signals of the input signal sources from received signals (communication address, ID. No., etc.), or identification signals attached to the input signals (communication address, ID No., etc.).

Reference numeral 43 denotes a display signal selection unit for performing division settings of the display areas based on user settings or external settings, and also simultaneously selecting for display in the set display areas. Reference numeral 44 denotes a communication information creating unit which receives the selection results of the display signals selecting unit 43, creates display attributes information for each of the display areas based on the EDID information of the display unit and creates display signal selection information as to the identified input signals.

Reference numeral 45 denotes a display signal selection information storing unit for storing display signal selection information, and 46 denotes a user operating unit such as a mouse or operating keys. Note that the input signal identification signal obtaining unit 42, display signal selection unit 43, and communication information creating unit 44 represent functions realized within the micro-computer.

Reference numeral 56 denotes the flow of the received image signals, 57 denotes the flow of identification signals obtained by the input signal identification signal obtaining unit 42, 58 denotes the flow of control signals relating to display signal selection with the user setting unit 46, 59 denotes the flow of display attributes information for each display area, and 60 denotes the flow of signals for controlling the memory control unit 33 according to a selection of display signals by the display signal selecting unit 43.

Reference numeral 61 denotes the flow of control signals for transmitting the selection results of the display signals by the display signal selecting unit 43 to the communication information creating unit 44, 62 denotes the flow of the display signals selection information created by the communication information creating unit 44 to the display signal selection information storing unit 45, 63 denotes the flow of display attribute information from the per-area display attributes information storing unit 41 to the communication unit 40, and 64 denotes the flow of display signal selection information from the display signal selection information storing unit 45 to the communication unit 40.

Reference numeral 23 denotes a sending line for sending image/audio signals, 24 denotes a sending line for control signals. Although in the figures the sending lines 23 and 34 are shown separately, in reality the arrangement may be such that communication is performed by the same exchanging units on the same memory between devices connected by cascade connections or tree connections for the TMDS or IEEE1394 lines.

Figure 3:
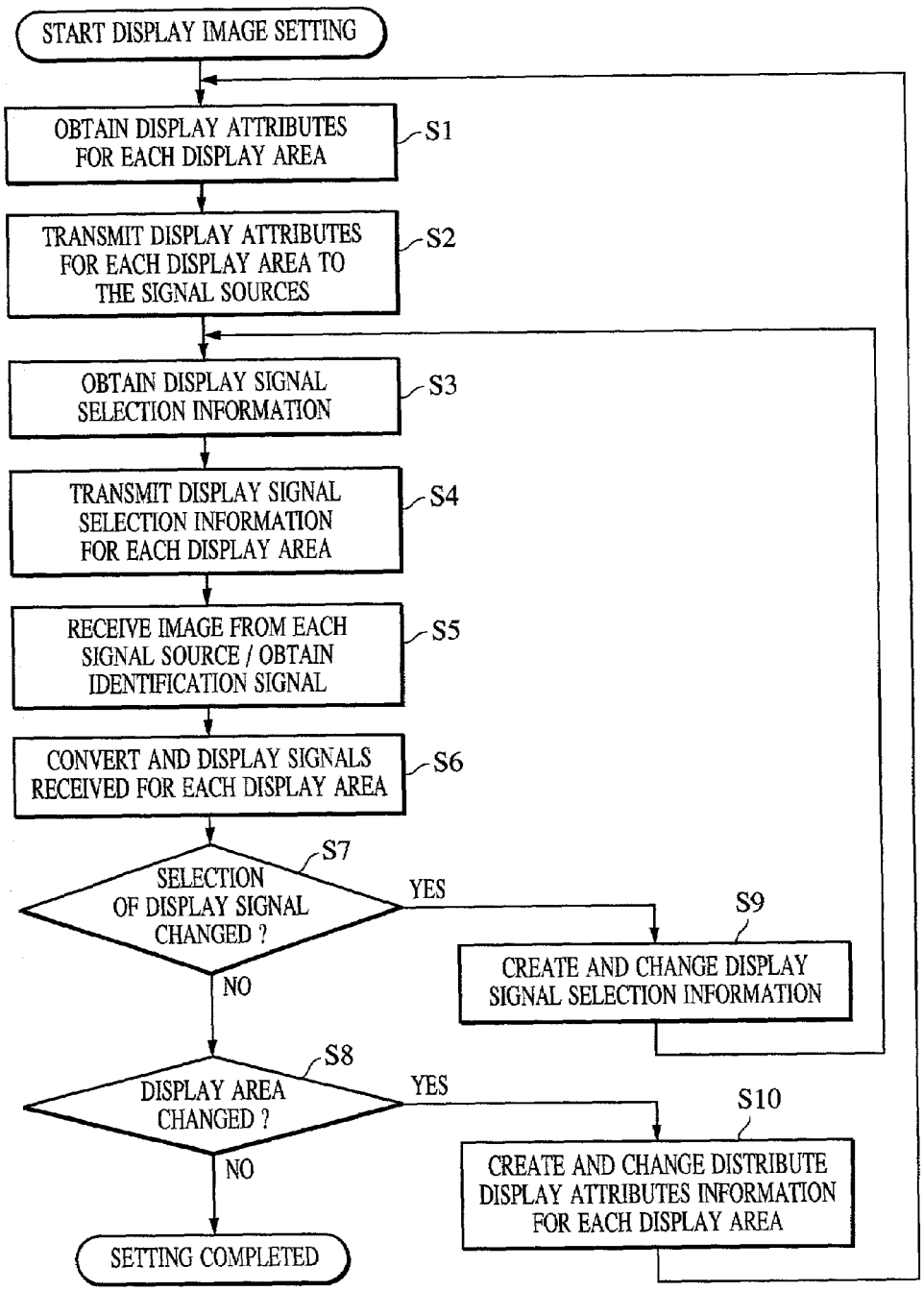
FIG. 3 is a flowchart illustrating display setting processing procedures for an image display device.

FIG. 3 is a flowchart illustrating the display setting processing procedures of the image display device 30. The processing program thereof is stored in a ROM (not shown) within the micro-computer unit 31, and is executed by a CPU (not shown) also within the micro-computer unit 31.

First, the display attributes information (EDID information) for each current display area is read out from the per-area display attributes information storing unit 41 (step S1). Notification is performed of the display attributes information for each display area to the signal sources connected to the network, and notification is made regarding each piece of image attributes information currently necessary for the image display device 30 to display each display area (step S2).

At the time of reading out the display signal selection information from the display signals selection information storing unit 45 indicating settings regarding which input signals are to be displayed on the display areas (step S3), the information read out is notified to the image signal sources, as with the display attributes information for each area (step S4). Consequently, the image signal sources appropriated to the display areas output the image information according to the notified display attributes information for each area, and also what sort of signals are to be output from the other image signal sources can be known.

The image information output by the image signal sources according to the display attributes information for each area is received by the image/audio receiving unit 32 (step S5). Also, simultaneously at this time, identification signals input at the input signal identification signal obtaining unit 42 are obtained. The obtained image signals are converted into images matching the display areas at the memory control unit 33, and synthesized into signals for the image display unit (step S6).

Judgment is made regarding whether or not to change the display signals (step S7). In the event of changing the display signals, the signals to be displayed in the display area to be changed by the user operating unit 46 or the like, display selection information is created, and changing is carried out (step S9). Subsequently, the flow returns to the processing of step S3, and setting is redone.

On the other hand, in the event that the display signals are not be to changed in step S7, judgment is made regarding whether or not to change the display area (step S8). In the event of changing the display area, the size and position of the display area to be change is instructed by the a user operating unit such as a mouse or digitizer, and also display attributes information for each display area is created and updated (step S10), the flow returns to the processing of step S1, and setting is redone. On the other hand in the event that the display area is not to be changed in step S8, this processing ends.

Thus, configuring the display attributes information for each area to be sendable enables the image information being sent from the image signals source side to be restricted to an amount necessary for the image area, so the amount of information on the network is reduced. Also, the configuration for sending display signal selection information which represents the display area appropriated for the identified input signals enables the signal source side or an arbitrary device on the network to grasp which signal source's images are currently being displayed at an arbitrary display area of an arbitrary display device, thus realizing a system capable of managing the communication amount on a network.

Now, display attributes for each area should relate to the number of pixels of the image display area, the size thereof, a planar positional relation, a positional relation of overlapping windows (positions for displaying to the front or back), a refresh cycle of the screen (refresh rate and partial rewriting cycle), a number of gradients, brightness, gamma properties, contrast, color properties, an aspect ratio, a sending format (sending method, compression method, compression percentage, rewriting cycle, etc.) information, and so forth, but are not restricted to any in particular.

Also, communication of the display attributes information for each area and the display signal selection information is not restricted to the conventional communication timing between displays and personal computers such as changing the input system with the user operating unit, changing display signals by changing the display area, and changing the size and position of a display area on the screen of the image display unit. Rather, communication of the display attributes information for each area and the display signal selection information may be performed at arbitrary timings on the network, such as at the time of changing the number of signals to be input to the picture signal input unit (image/audio receiving unit 32) or changing the number of signals on the network, at the time of changing the attributes of the input signals or the signals on the network, at the time of changing the usage of the screen area on the image display unit 36, at the time of changing the contents of each of the images input to the image input unit (image/audio receiving unit 32), at the time of changing the positional relation of multiple picture-in-picture images on the image display screen 36, at the time of receiving request signals from the image signal sources, at the time of detecting an image signal source being connected or power thereof being turned on, and so forth. Consequently, a flexible display control system can be realized for multiple-to-multiple systems unique to networks.

Also, the display signal selection information is created as to an identification signal obtained from the input signals, but this identification signal may be anything by which the originator of the signal can identify the display device and the other equipment connected to the network, such as an identification number or communication address provided to the signal source of the input picture signals, an identification number or communication address provided for each output mode of the signals sources of the input picture signals, an identification number or communication address provided to each output channel of the signal source of the input picture signals, an identification number or communication address provided to the input picture signals themselves, an identification number or communication address provided to the user of the signal source of the input picture signals, and so forth.

FIG. 4 is a diagram illustrating the communication format of the display attributes information for each area. In the figure, symbol H1 denotes the communication address of the recipient, and is, for example, a communication address or identification number (ID) provided to the image display device, a communication address or identification number (ID) provided to a channel screen or window screen of the image display device, or so forth. The communication address of the recipient is an a-byte signal, e.g., around 4 bytes in size.

Symbol H2 denotes the communication address of the originator, and is, for example, a communication address or identification number (ID) provided to the image signal source or a communication address or identification number (ID) provided to the image signals itself. The communication address of the originator is a b-byte signal, e.g., around 4 bytes in size. The identification signal detected by the image display device is equivalent to the data of this portion.

Symbol H3 denotes the identification number (ID) appropriated to each display area such as channel screen or window set to the image display device 30. The identification number (ID) is a c-byte signal, e.g., around 1 byte in size. Symbol H4 denotes a display attributes information portion, which is a d-byte signal, and H5 denotes a portion indicating the end of the data or the like and is a checksum portion or the like. This part is e bytes, and in practice is around 1 byte in size.

FIG. 5 is a diagram illustrating the communication format of display signal selection information. In the figure, H1, H2, H3, and H5 are the same as that shown in FIG. 4; H6 is a display signals selection information portion, and is of a size of f bytes.

Figure 6:
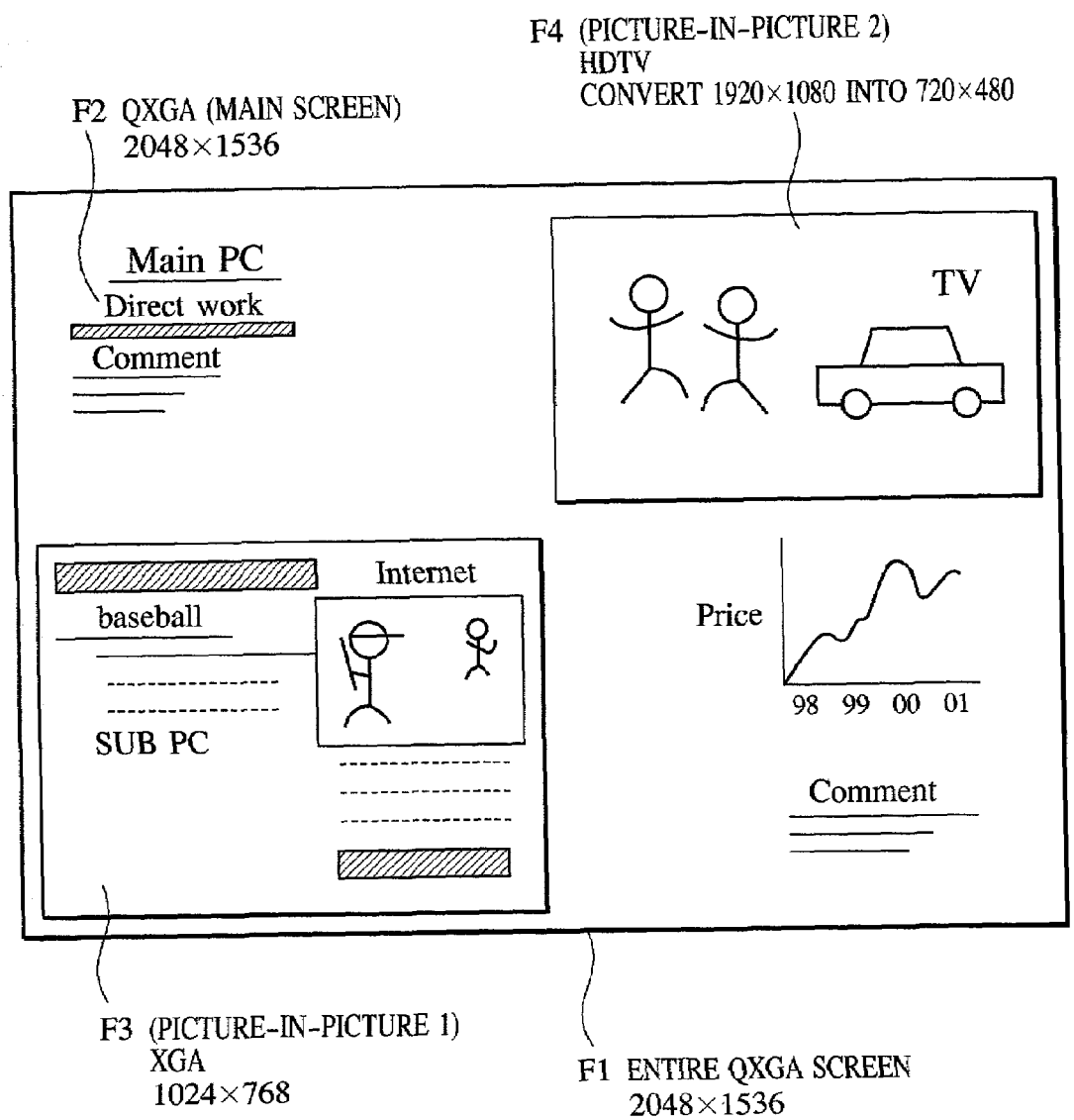
FIG. 6 is a diagram illustrating a display screen of an image display device.

The following is a description of an arrangement wherein display is performed by managing the amount of information with such a display control system. In order to facilitate description, let us say that the amount of information per second is the number of pixels×the refresh rate×the number of bits (unit bps). FIG. 6 is a diagram illustrating the display screen of the image display device 30. This image display device has the number of pixels for QXGA (2048×1536 pixels), and in the figure, F1 denotes the overall display area, and F2 denotes the display image of a personal computer serving as the image signal source 3 (1c) connected to this image display device. The resolution of this image is QXGA (2048×1536 pixels), and display thereof is set for the entire display area F1. Image contents are the work screen of the personal computer, for output of word processor screens, graphs, and so forth.

The picture-in-picture area F3 is set for the display image of a personal computer PC1a serving as the image signal source 1 connected to this image display device. Here, homepage images SXGA (1280×1024 pixels) including information such as baseball scores and the like are output.

The picture-in-picture area F4 is set for the display image of a personal computer PC1b serving as the image signal source 2 connected to this image display device. Here, images of an HDTV (1920×1080 pixels) movie played with a DVD playing unit, which is one of the recording media 5b, are output.

FIG. 7 is a table illustrating the display attributes, signal sources, and input identification signals for each of the display areas. The image display device 30 communicates the display attributes information of each display area and the selection signals information appropriated to the display areas, to devices on the network. Image display attributes information, such as a resolution of 1024×768 and 8-bit gradients, is communicated to the image signal source 1a as display attributes information for each of the display areas. Also, image display attributes information, such as a resolution of 720×480 and 8-bit gradients, is communicated to the image signal source 2a.

Obtaining this image display attributes information for each area allows the image signal source 1 to convert the image which was originally SXGA (1280×1024) into XGA (1024×768) resolution and output the image accordingly. Also, the image signal source 2 converts the image which was originally HDTV (1920×1080) into 720×480 resolution and outputs the image.

Figure 8:
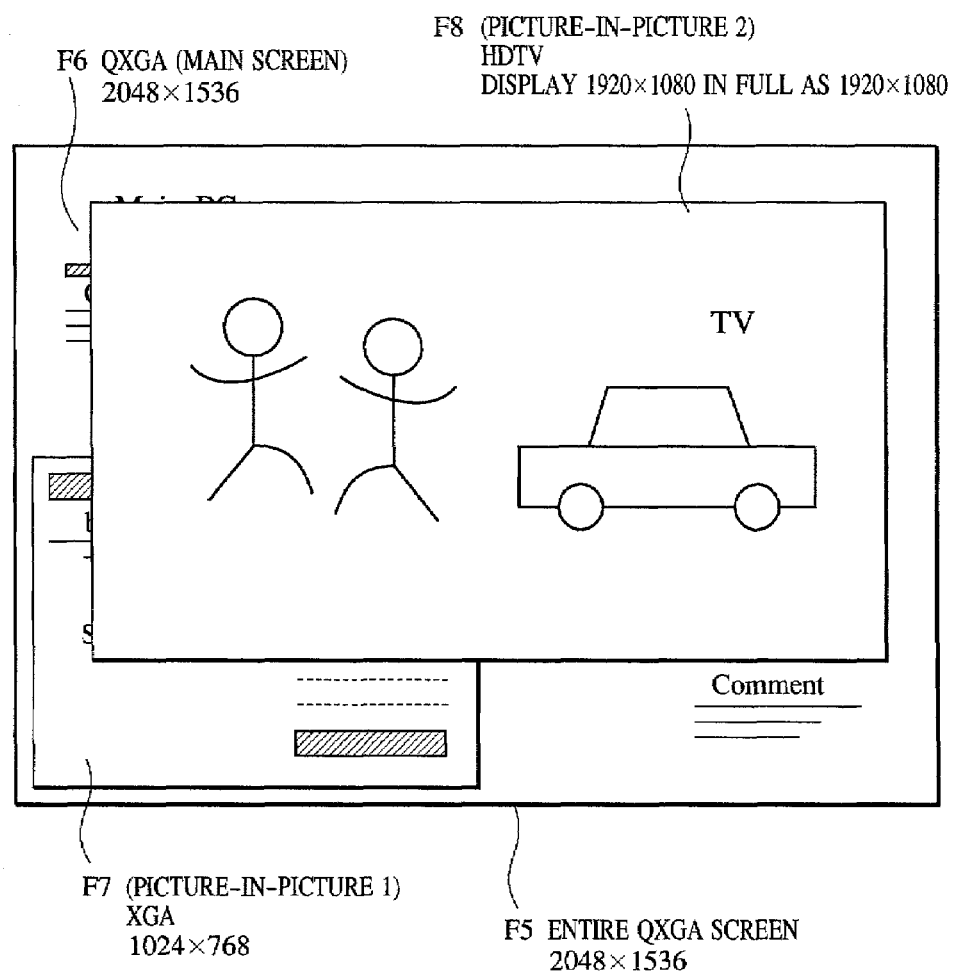
FIG. 8 is a diagram illustrating a display screen of an image display device in the event that a display area has been changed.

Thus, an image information amount that was originally 3.1 Gbps can be reduced to 2.1 Gbps by the signal sources, and output as follows:

F2: QXGA=2048×1536×60×8=1.5 Gbps
F3: SXGA=1280×1280×60×8=0.6 Gbps
F4: HDTV=1920×1080×60×8=1.0 Gbps
Total: 3.1 Gbps
F2: QXGA=2048×1536×60×8=1.5 Gbps
F3: XGA=1024×768×60×8=0.4 Gbps
F4: SDTV=720×480×60×8=0.2 Gbps
Total: 2.1 Gbps FIG. 8 is a diagram illustrating a display screen on the image display device in the event that the display area is changed. In the event that the display area F4 has been changed and enlarged to HDTV (1920×1080) resolution, new display attributes for each display area and display signals selection information, such as shown in FIG. 9, is communicated to the image signal source 2 and the other devices on the network. FIG. 9 is a table illustrating the display attributes, signal sources, and input identification signals for each of the display areas.

Due to this change in the display areas, the signal amount on the network is calculated as being 2.5 Gbps, as follows:

F2: QXGA=2048×1536×60×8=1.5 Gbps
F3: XGA=1024×768×60×8=0.4 Gbps
F4: HDTV=1920×1080×60×8=1.0 Gbps
Total: 2.9 Gbps Now, this control system recognizes that the upper limit value that can be sent over this network is 2.5 Gbps. Accordingly, in the event of performing management of the amount information for this system, judgment is made to output the output images of both the image signal source 3 and the image signal source 1 with 30 Hz refresh frequencies instead of 60 Hz, since motion properties of the images other than the HDTV in the display area F4 are not high in priority. Accordingly, the amount of information is controlled to a value which can be sent, as follows:

F2: QXGA=2048×1536×30×8=0.8 Gbps
F3: XGA=1024×768×30×8=0.2 Gbps
F4: HDTV=1920×1080×60×8=1.0 Gbps
Total: 2.0 Gbps Accordingly, the image display device communicates display attributes for each display area and display signals selection information, and arbitrary devices connected to the network control the amount of sent information, thereby preventing image deterioration and communication trouble due to excessive information being sent, thus realizing a suitable multi-image display.

The present embodiment comprises means for communicating the display attributes information, for each of the display areas, to the display device side, and means for communicating display signal selection information, thereby suppressing the amount of information itself, and also comprises means for communicating information for grasping the amount of information between differing types of devices on the network, thereby realizing a display control system capable of flexibly handling new signals and changes in output attributes of signal sources.

Incidentally, examples of control methods applicable as means for controlling the amount of communication include the above-described restricting of the image display area (not showing picture-in-picture areas), changing the number of pixels of the screen (resolution), changing the refresh cycle of the screen, and further include changing the image attributes (refresh cycle of the screen, number of gradients, color, aspect ratio, etc.) of the signals being sent, the sending method (sending method, compressing method, compression percentage, rewriting cycle, etc.), and so forth.

(Second Embodiment)

The second embodiment relates to an arrangement which is applied to a displaying operation that uses image transfer on a network, wherein signals with different formats such as image compression signals are partially rewritten, and MPEG2 compression signals from a DTV tuner, etc., are sent on the same image sending line such as an IEEE1394.

Figure 10:
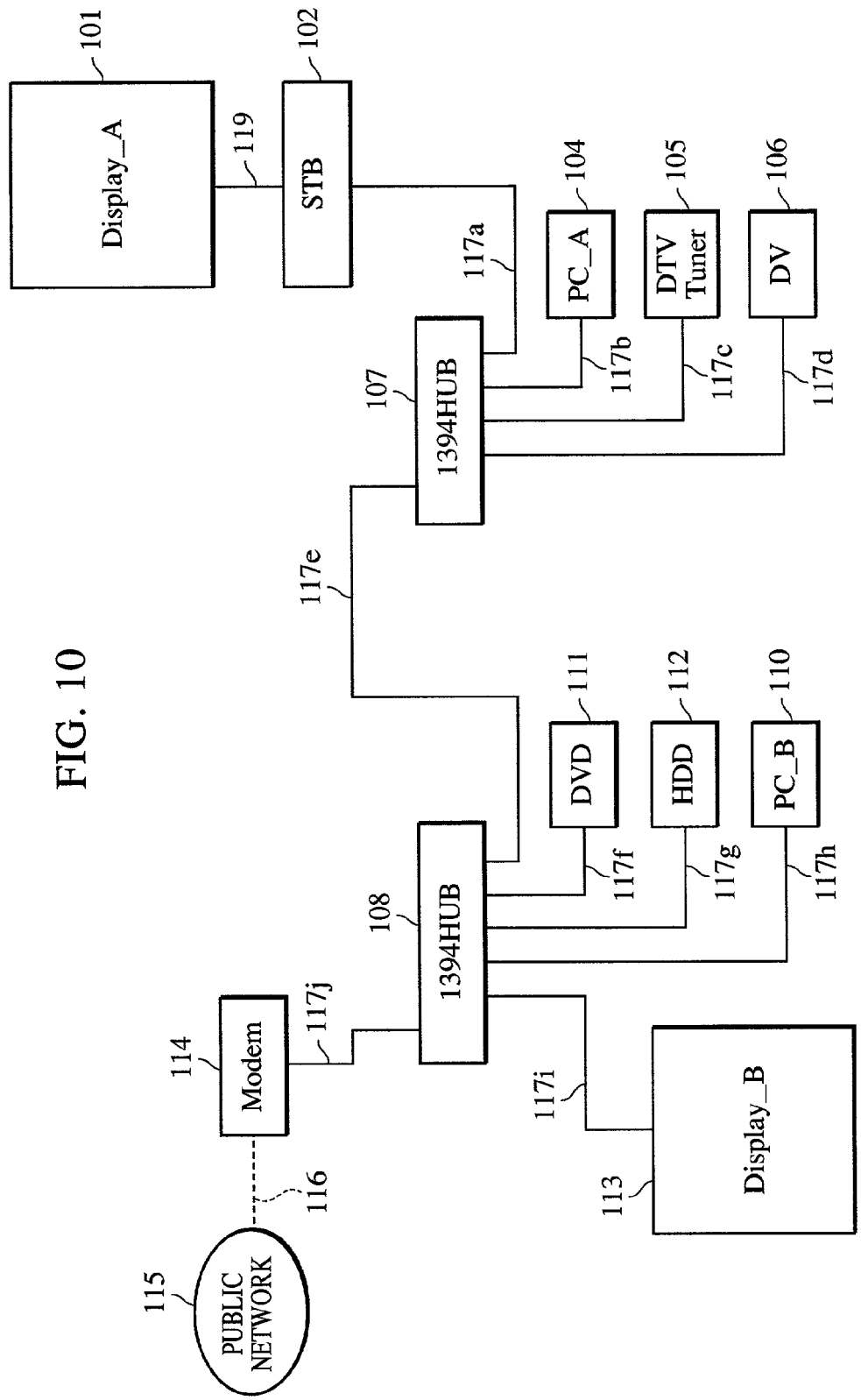
FIG. 10 is a block diagram illustrating the configuration of a display control system according to a second embodiment.

FIG. 10 is a block diagram illustrating the configuration of the display control system according to the second embodiment. This display control system is made up of devices connected to the network.

In the figure, reference numerals 101 and 113 denote display devices for performing multi-screen display. The display device 101 is connected to a network such as an IEEE1394 network, via a set-up box (STB) 102, and is connected to the STB 102 by an image-dedicated capable 119, such as for TMDS. Also, the display device 113 has an IEEE1394 decoder built in, and accordingly is directly connected to the network. The STB 102 and the display device 113 are respectively equivalent to the display control device and the image display device according to the present invention. Reference numeral 104 denotes a personal computer (PC_A), and 113 denotes a personal computer (PC_B). The display operations of the personal computers 104 and 110 are also performed by the display devices 101 and 113, over the network.

Reference numeral 105 denotes a digital television tuner (DTV TUNER) from a different system. Reference numeral 106 denotes a digital video, 111 a DVD disk player (DVD), and 112 denotes a hard disk drive (HDD) for recording programs. These audio-visual devices are connected to the IEEE1394 network, and mutually exchange image signals.

Reference numeral 114 denotes a modem connected to a public network 115, 116 denotes a telephone line or the like connected to the public network, 107 and 108 denote hubs for dividing and connecting IEEE1394 signals, and 117a through 117j are IEEE1394 standards communication lines.

With an in-home network thus connected, a user can realize an environment wherein various sources (PC_A, PC_B, DTV TUNER, DV, DVD, and HDD) can be operated remotely from the televisions (display devices) 101 and 113. Though keyboards and mouses are not shown for the PC_A and PC_B, these are operated from near the display devices via the IEEE1394 network, as with images.

A case of realizing the display shown in FIGS. 6 and 8 in the same ways as the first embodiment, using the network shown in FIG. 10, will now be described. The image display device is a display device having a number of pixels for QXGA (2048×1536 pixels), and in the figure, F1 denotes the overall display area, and F2 denotes the display area of the display image of a personal computer connected to this image display device. The resolution of this image is QXGA (2048×1536 pixels), and display thereof is set for the entire display area (full-screen) F1. Image contents are the work screen of the personal computer, for output of word processor screens, graphs, and so forth.

The picture-in-picture area F3 is set for the display image of a personal computer connected to this image display device. Here, SXGA (1280×1024 pixels) homepage images including information such as baseball scores and the like are displayed on an XGA (1024×768 pixels) area. Also, the picture-in-picture area F4 can display HDTV (1920×1080 pixels) resolution pictures of a digital television tuner converted into 1024×576 pixels, on an area ¼ of the main screen.

Thus, the arrangement is configured so as to allow display attributes information for each of the display areas and display signal selection information to be sent, in order to divide the screen area and perform multi-screen display of the images of the multiple devices on the network.

Thus, the signal source side of arbitrary devices on the network send only necessary image information matching the display areas, and determine which signal source's images are currently being displayed at an arbitrary display area of an arbitrary display device, thereby reducing the amount of communication on the network and configuring a display control system capable of managing the communication amount.

Now, a case will be described wherein the personal computer 110 serves as the signal source for sending the images of the main screen in FIGS. 6 and 8, the personal computer 104 serves as the signal source for sending the images of the picture-in-picture screen F3, and the tuner 105 serves as the signal source for sending the images of the picture-in-picture screen F4. Also, the set-up box 102 serves as the display control device for synthesizing these images and performing display control of the display device 101.

Figure 11:
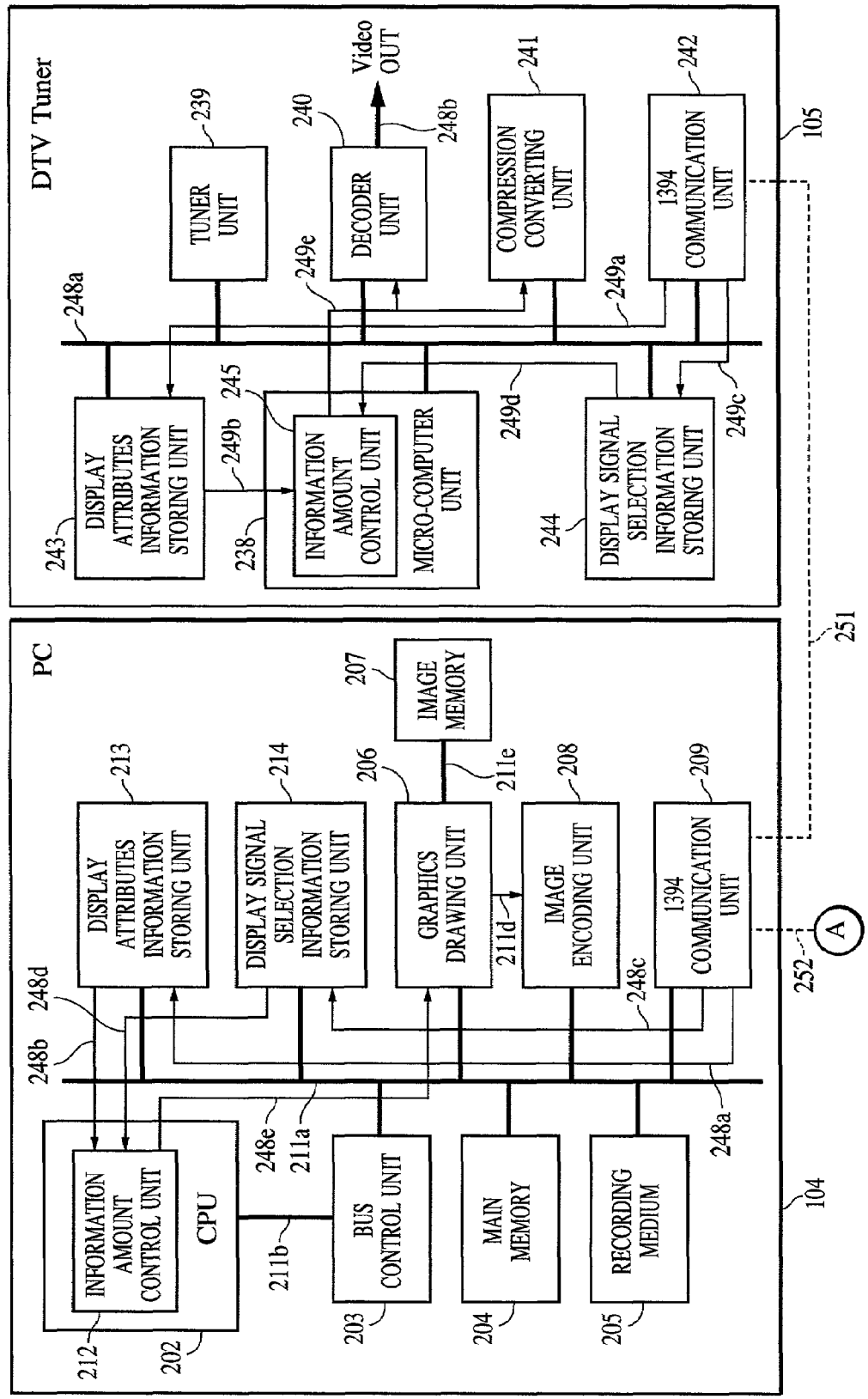
FIG. 11 is a block diagram illustrating a specific configuration of a personal computer and a DTV tuner in a display control system.
Figure 12:
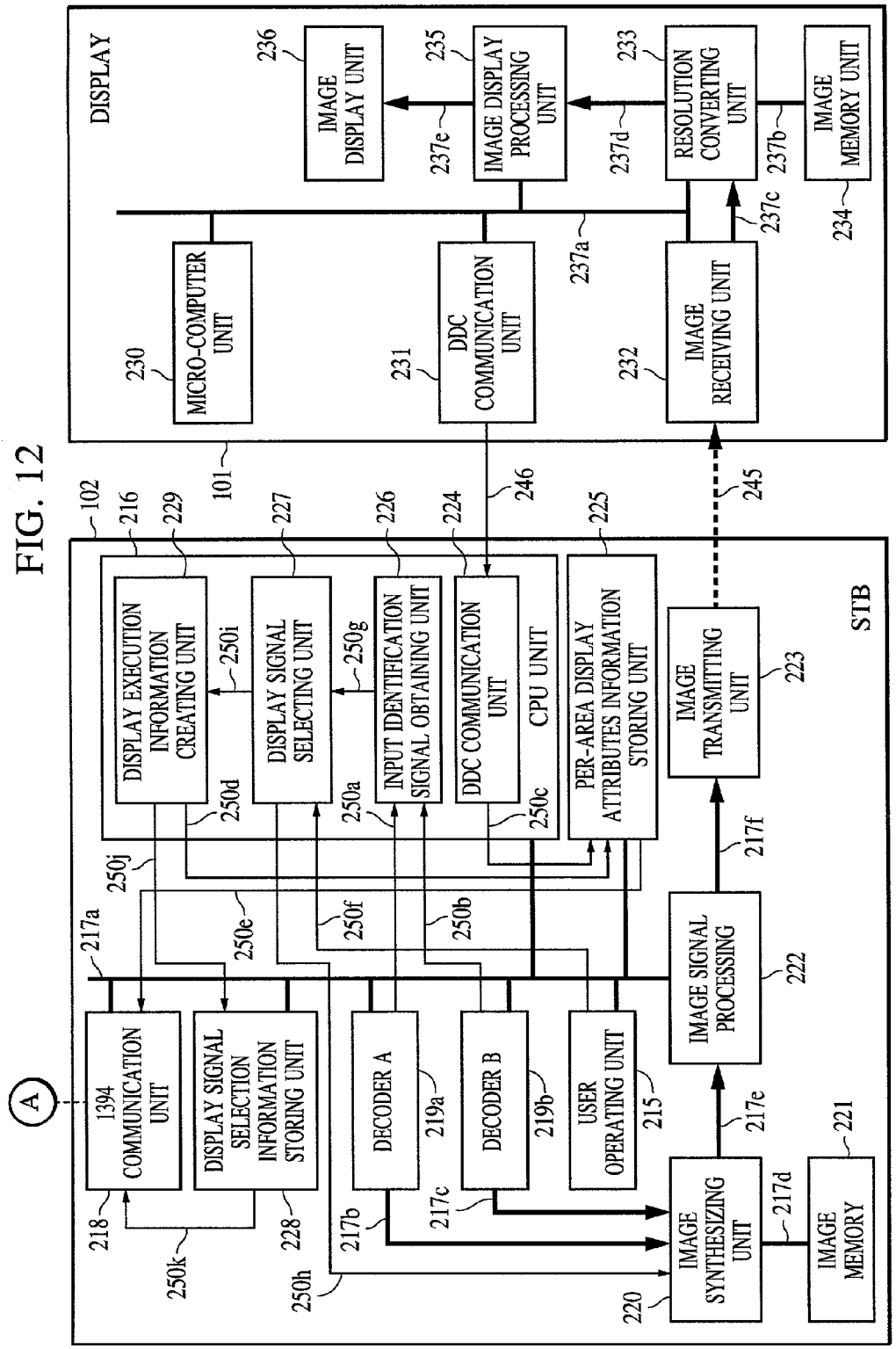
FIG. 12 is a block diagram illustrating a specific configuration of a set-up box and a display device in a display control system.
Figure 13:
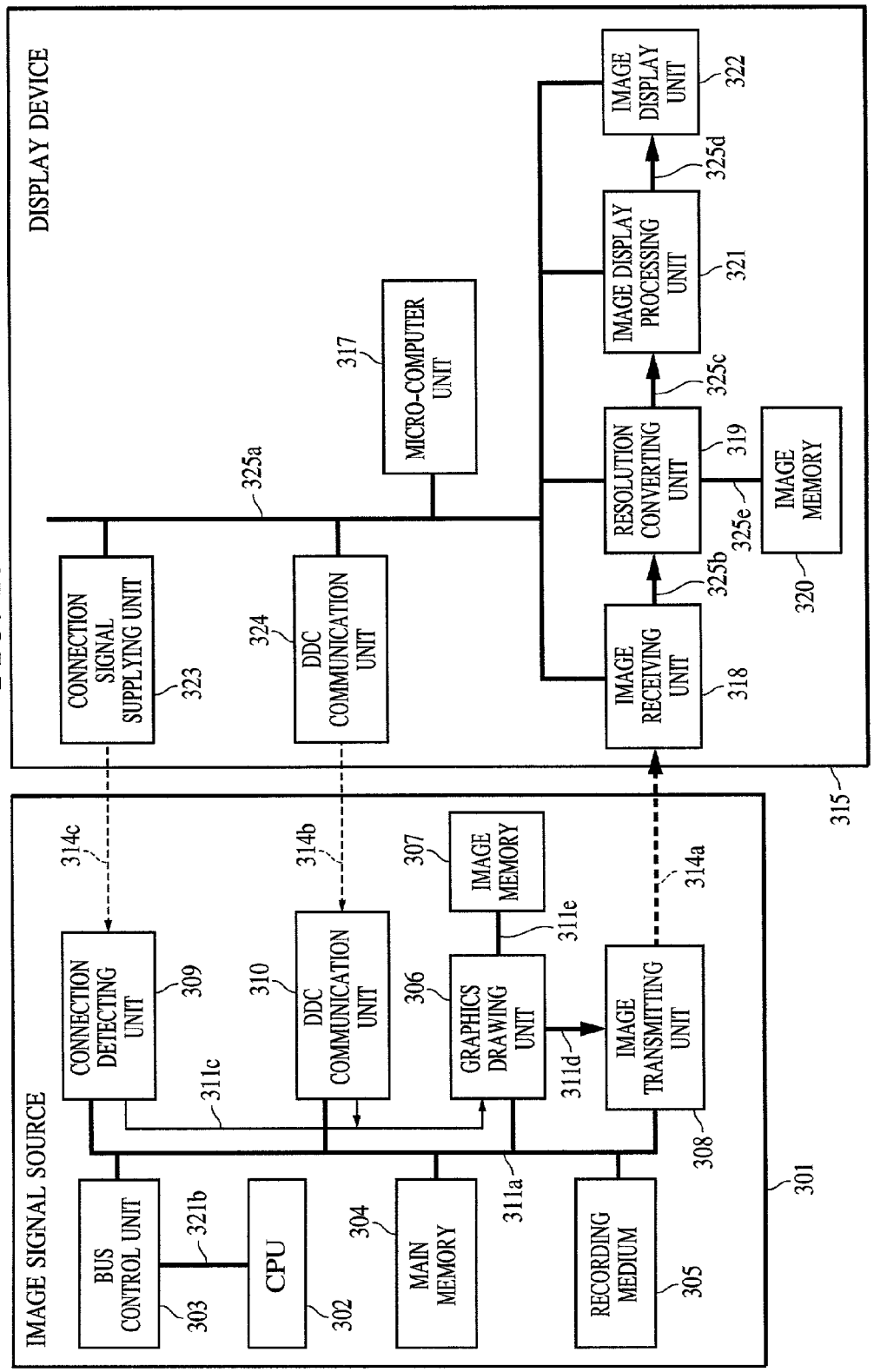
FIG. 13 is a block diagram illustrating the configuration of a display device for a personal computer, as a conventional common display device.
Figure 14:
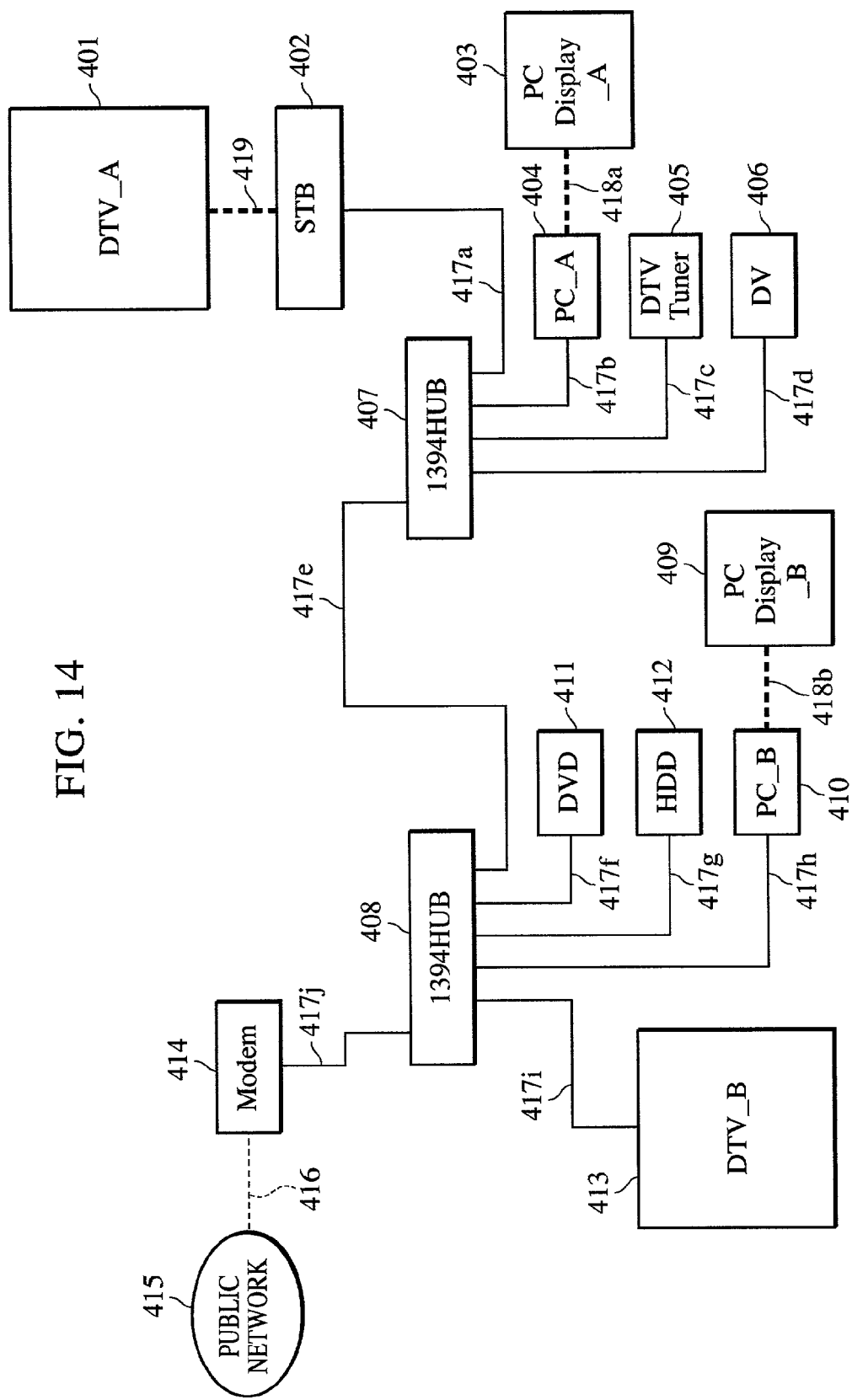
FIG. 14 is a block diagram illustrating connections between various devices under a home appliance communication standard, such as HAVi or Jini, which are currently in the process of standardization.

FIG. 11 is a block diagram illustrating a specific configuration of the personal computer 104 and DTV tuner 105 in the display control system. FIG. 12 is a block diagram illustrating the specific configuration of the set-up box 102 and the display device 101 in the display control system. The set-up box 102 synthesizes the image signals from the signal sources sent via the network, and also performs conversion into display output of the display devices.

In the personal computer 104, reference numeral 202 denotes a CPU (Central Processing Unit), 203 denotes a bus control unit for controlling an overall data bus and a control bus as well as sending the control signals of this CPU to the components, 211a denotes a system bus line made up of the data bus and the control bus connecting the components, and 211b denotes a bus line between the CPU 202 and the bus control unit 203.

Reference numeral 204 denotes a main memory of the personal computer 104, 205 denotes a recording medium such as a hard disk or the like, and 206 denotes a graphics drawing unit for creating image signals for a display operation, wherein output according to the output image attributes for the display devices (resolution, pixel frequency, screen refresh frequency, gamma properties, gradients, color properties, etc.) is performed.

Reference numeral 207 denotes an image memory used by a graphics drawing unit 306 at the time of processing images, 211e denotes a data bus and a control bus between the graphics drawing unit 206 and the image memory 207, and 208 denotes an image encoder unit for performing partial rewriting conversion and compression of image signals created at the graphics drawing unit 206 for sending to the display devices.

Reference numeral 209 denotes an IEEE1394 communication portion for converting the compressed partially rewritten signals into IEEE1394 signals and communicating, 212 denotes an information amount control unit for receiving display attributes information for each area and display signal selection information received from the display 101, and controlling the graphics drawing unit 206 and the like, 213 denotes a display attributes information storing unit for storing display attributes information for each of the display areas communicated from the display device 101, and 214 denotes a display signal selection information storing unit for storing display signal selection information communicated from the display device 101.

In the tuner 105, reference numeral 238 denotes a microcomputer unit for controlling the tuner 105, 248a is a line group made up of a control bus from the micro-computer unit 238 and a data bus, 239 denotes a tuner unit for receiving signals from an antenna and outputting MPEG signals, 240 denotes an MPEG decoding unit for decoding the MPEG signals and outputting video output signals, and 248b is a signal line thereof.

Reference numeral 241 denotes a compression format converting unit, which converts the read MPEG signals into compression signals with arbitrary resolution and screen refresh frequencies, 242 denotes an IEEE1394 communication unit for converting the compressed image signals into IEEE1394 signals and communicating, and 423 denotes a display attributes information storing unit for storing the display attributes information for each display area, communicated from the display device 101.

Reference numeral 244 denotes a display signal selection information storing unit for storing the display signal selection information communicated from the display device 101, and 245 denotes an information amount control unit for receiving display attributes information for each area and display signal selection information received from the display 101, and controlling the graphics drawing unit and the like.

In the STB 102, reference numeral 215 denotes a user operating unit for the user to perform input operations, 216 denotes a CPU unit for controlling this STB 102, 217 denotes a line group made up of the CPU unit 206 control bus and data bus, 218 denotes an IEEE1394 communication unit, 219a denotes a decoder for decoding from the compression images input from the IEEE1394 partially rewritten image signals and the like, and converting these into RGB 24-bit signals capable of being used for computation for image synthesizing. Reference numeral 219b denotes a decoder for decoding from the compression images input from the IEEE1394 MPEG compressing signals and the like, and converting these into RGB 24-bit signals capable of being used for computation for image synthesizing.

Reference numerals 217*b* and 217*c* denote data buses for decoded image signals, 220 denotes an image synthesizing unit for synthesizing the output from the multiple decoders 219*a* and 219*b*, 221 denotes a memory used for image synthesizing, 217*d* denotes a line group made up of a memory control bus and a data bus, 222 denotes an image signal processing unit for converting gamma properties and color properties and the like of synthesized image signals according to the properties of the liquid crystal device or CRT used for the image display unit, and performing character display such as on-screen display. Reference numeral 223 denotes a VGA, DVI, etc., standard image transmitting unit for outputting signals to image display units configured of devices such as liquid crystal, CRT, PDP, EL, LED, etc., and reference numerals 217*e* and 217*f* denote image data busses.

Reference numeral 224 denotes a DDC communication unit for communicating EDID information with the display device 101, 225 denotes a per-area display attributes information storing unit for storing attributes information for each display area, and 226 denotes an input signal identification signal obtaining unit for performing detection of identification signals of the input signal sources from received signals (communication address, ID, etc.), or identification signals attached to the input signals (communication address, ID, etc.).

Reference numeral 227 denotes a display signal selection unit for performing division settings of the display areas based on user settings or external settings, and also for simultaneously selecting for display in the set display areas, and 229 denotes a communication information creating unit which receives the selection results of the display signals selecting unit 227, and performs creating of display attributes information, for each of the display areas based on the EDID information of the display unit creating display signal selection information, as to the identified input signals.

Reference numeral 228 denotes a display signal selection information storing unit for storing display signal selection information. Now, the input signal identification signal obtaining unit 226, display signal selection unit 227, and communication information creating unit 229 indicate functions realized within the CPU.

In the display device 101, reference numeral 230 denotes a micro-computer unit for controlling the display device 101, 237*a* denotes a line group of the control bus and data bus from the micro-computer unit 230, 231 denotes a DDC communication unit for communicating EDID information with the personal computer, STB, and so forth, and 232 denotes an image receiving unit for receiving VGA, DVI, and other such image signals sent from the STB 102 and converting the signals into a format which is suitable for signal processing, such as RGB 8-bit signals.

Reference numeral 233 denotes a resolution converting unit for performing conversion such as resolution conversion or image refreshing frequency conversion, for matching the number of pixels of the received image to the display pixel number of the display device 101, 234 denotes an image memory used for the processing of the resolution converting unit 233, 237*b* denotes a line group of a data bus and control bus for the image memory 234, and 235 denotes an image display processing unit for converting gamma properties, color properties, etc., to match the properties of the liquid crystal or CRT image display unit, and for performing text display such as on-screen display.

Reference numeral 236 denotes an image display unit made up of devices such as liquid crystal, CRT, PDP, EL, LED, or the like, and 237*c* and 237*e* denote input signal data busses. Between the devices, 251 and 252 denote communication lines such as IEEE1394 or the like, and communication of image signals compressed by different compression methods is performed according to the same sending protocol. Also, communication of information amount control signals is performed on the same sending line.

Reference numeral 245 denotes image signal lines connected with conventional image-dedicated cables such as VGA or DVI, and 246 denotes a conventional DDC communication line.

In the STB 102, reference numeral 250*a* denotes the flow of input identification signals detected with the decoder A (219*a*), and 250*b* denotes the flow of input identification signals detected with the decoder B (219*b*).

Reference numeral 250*d* denotes the flow of signals from the display execution information creating unit 229 to the display attributes information storing unit 225, and 250*e* denotes the flow of per-area display attributes information from the display attributes information storing unit 225 to the communication unit 218.

Reference numeral 250*f* denotes the flow of control signals relating to display signal selection with the user setting unit, 250*g* denotes the flow of identification signals obtained from the input identification signal obtaining unit 226 to the display signal selecting unit 227, 250*h* denotes the flow of signals for controlling the image synthesizing unit 220 according to the selection of display signals by the display signal selecting unit 227, 250*i* denotes the flow of control signals for notifying the display signals selection information creating unit 229 of the selection results of display signals by the display signal selecting unit 227, 250*j* denotes the flow of the signals created by the display signals selection information creating unit 229 to the display signal selection information storing unit 228, and 250*k* denotes the flow of display signal selection information from the display signal selection information storing unit 228 to the communication unit 218.

In the personal computer 104, reference numeral 428*a* denotes, of the received IEEE1394 signals, the flow of display attributes information for each area to the display attributes information storing unit 213, and 248*b* denotes the flow of display attributes information for each area read from the display attributes information storing unit 213 to the information amount control unit 212. Reference numeral 428*c* denotes, of the received IEEE1394 signals, the flow of display signal selection information to the display signal selection information storing unit 214, 248*d* denotes the flow of display signal selection information read from the display signal selection information storing unit 214 to the information amount control unit 212, and 248*e* denotes the flow of control signals from the information amount control unit 212 to the graphics drawing unit 206.

In the tuner 105, reference numeral 429*a* denotes, of the received IEEE1394 signals, the flow of display attributes information for each area to the display attributes information storing unit 213, and 249*b* denotes the flow of display attributes information for each area read from the display attributes information storing unit 243 to the information amount control unit 245. Reference numeral 429*c* denotes, of the received IEEE1394 signals, the flow of display signal selection information to the display signal selection information storing unit 244, 249*d* denotes the flow of display signal selection information read from the display signal selection information storing unit 244 to the information amount control unit 245, and 249e denotes the flow of control signals from the information amount control unit 245 to the MPEG decoder unit 240 and compression conversion unit 241.

With the second embodiment, the configuration of the display device 101 is the same as conventional arrangements, but the set-up box (STB) 102 is arranged so as to communicate display attributes information for each area and display signal selection information, for each signal source, thereby suppressing the amount of sent information from the signals sources, and also allowing signal sources or arbitrary devices on the network to manage the amount of information on the network. Also, the set-up box 102 makes reference to the EDID information obtained by DDC communication with the display device 101, and accordingly creates display attributes information for each area.

With the display control system according to the second embodiment, display image setting is performed according to the same flowchart as that for the first embodiment. The display setting operation will be described with the flowchart shown in FIG. 3, with reference to FIGS. 11 and 12. The processing program thereof is stored in a ROM (not shown) within the CPU unit 216 within the set-up box 102, and is executed by the CPU.

First, the display attributes information (EDID information) for each current display area is read out from the per-area display attributes information storing unit 225 (step S1). The display attributes information for each display area is communicated to the signal sources connected to the network, and notification is made regarding each piece of image attributes information currently necessary for the image display device 101 to display each display area (step S2).

At the time of reading out the display signal selection information from the display signals selection information storing unit 228 indicating settings regarding which input signals are to be currently displayed on the display areas (step S3), the information read out is notified to the image signal sources, as with the display attributes information for each area (step S4). Consequently, the image signal sources appropriated to the display areas output the image information according to the notified display attributes information for each area, and also what sort of signals are to be output from the other image signal sources can be known.

The image information output by the image signal sources according to the display attributes information for each area is received by the IEEE1394 communication unit 218 (step S5). Also, at this time, identification signals are obtained by the input signal identification signal obtaining unit 226.

The obtained image signals are converted into images matching the display areas at the image synthesizing unit 220, and synthesized into signals for the image display unit (step S6). Judgment is made regarding whether or not to change the selection of the display signals (step S7), and in the event of changing the display signals, the signals to be displayed in the display area to be changed by the user operating unit 215 or the like, display selection information is created, changing is carried out (step S9), the flow then returns to the processing of step S3, and setting is redone.

On the other hand, in the event that the display signals are not be to changed in step S7, judgment is made regarding whether or not to change the display area (step S8), and in the event of changing the display area, the size and position of the display area to be changed is instructed by the a user operating unit 215 such as a mouse or a digitizer, display attributes information for each display area is created and updated (step S10), following which the flow returns to the processing of step S1, and setting is redone. On the other hand, in the event that the display area is not to be changed in step S8, this setting processing ends.

Thus, configuring the display attributes information for each area to be sendable enables the image information being sent from the image signals source side to be restricted to an amount necessary for the image area, so the amount of information on the network can be reduced.

Also, the configuration for enabling sending of display signal selection information which represents the display area appropriated for the identified input signals enables the signal source side to or an arbitrary device on the network to determine which signal source's images are currently being displayed at an arbitrary display area of an arbitrary display device, thus realizing a system capable of managing the communication amount on a network.

Also, not only can image signals and other control signals be sent over the same network, but there is no more need to use dedicated cables which are relatively heavy and restricted to 10 m or less in sending distance, as with conventional VGA or DVI standard TMDS cables. Accordingly, the personal computer main unit and the display device can be positioned at distances removed from one another.

Furthermore, DVDs, digital broadcasts, DVs, and other audio-visual home appliance networks can be integrated with personal computer images, and can be controlled on the same display devices.

Now, while the present invention has been thus described with reference to embodiments, the present invention is by no means restricted to the embodiments; rather, any configuration whereby the functions laid out in the scope of the claims or the functions of the configurations of the embodiments can be achieved, is applicable.

Also, it is needless to say that the functions of the above-described embodiments can be achieved by an arrangement wherein a recording medium storing software program code for realizing the functions of the above embodiment is supplied to the system or device. In this case, the program code itself read out from the recording medium realizes the functions of the above-described embodiment, and the recording medium storing the program code comprises the invention.

In the above embodiments, the program code shown in the flowchart in FIG. 3 is stored in a ROM which is a recording medium. Examples of recording media for supplying the program code include floppy disks, hard disks, optical disks, magneto-optical disks, CD-ROMs, CD-Rs, DVDs, magnetic tape, non-volatile memory cards, and so forth.

According to the present invention, the display attributes information for each area can be sent to multiple signals sources, and accordingly the image signals source side can restrict transmission to an amount necessary, so the amount of information on the network can be reduced.

Also, the configuration for enabling sending of display signal selection information enables the signal source side or an arbitrary device on the network to determine which signal source's images are currently being displayed at an arbitrary display area of an arbitrary display device. Thus, a system capable of managing the communication amount on a network can be realized.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A display control device for controlling a display to display, on a single screen, a plurality of pictures, which are from a respective plurality of signal sources connected to signal lines, wherein the plurality of pictures are displayed in a respective plurality of display windows on the screen, said display control device comprising:
    an obtaining unit, which obtains identification signals relating to the plurality of pictures from the plurality of signal sources;
    a display selection information creating unit, which creates display selection information based on the obtained identification signals;
    a display selection unit, which appropriates each of the plurality of pictures to a respectively corresponding one of the plurality of display windows on the single screen according to the created display selection information; and
    a notification unit which, for each of the plurality of signal sources, notifies that signal source of (i) the created display selection information and (ii) information identifying the signal source,
    wherein the plurality of signal sources are separate apparatuses.

2. A display control device according to claim 1, further comprising:
    an image memory, which stores a plurality of pictures inputted from the plurality of signal sources connected to the signal lines; and
    an area securing unit, which secures a storage area for storing each of the plurality of pictures in said image memory, according to the created display selection information.

3. A display control device according to claim 1, wherein the display selection information is created or changed according to a setting of a display window.

4. A display control device according to claim 3, wherein a notification by said notification unit is performed synchronously with a change in the display selection information.

5. A display control device according to claim 1, wherein a notification by said notification unit is performed synchronously with a change in a number of inputted pictures.

6. A display control device according to claim 1, wherein a notification by said notification unit is performed synchronously with at least one of:
    a change in a number of signals on a network comprising the signal lines; and
    a change in an attribute of a signal.

7. A display control device according to claim 1, wherein a notification by said notification unit is performed synchronously with a change in size or position of a display window of an inputted picture on the screen.

8. A display control device according to claim 1, wherein the identification signals obtained by said obtaining unit are identification numbers or communication addresses provided to users of the plurality of signal sources for the pictures.

9. A display control device according to claim 1, wherein a notification by said notification unit is performed synchronously with a change in size or position of a display window on the screen.

10. A display control device according to claim 1, wherein a notification by said notification unit is performed synchronously with a change in usage of a display window.

11. A display control device according to claim 1, wherein a notification by said notification unit is performed synchronously with a change in content of an inputted picture.

12. A display control device according to claim 1, wherein a notification by said notification unit is performed synchronously with a change in a positional relation of a plurality of picture-in-picture windows on the screen.

13. A display control device according to claim 1, wherein the identification signals obtained by said obtaining unit are identification numbers provided to the plurality of signal sources.

14. A display control device according to claim 1, wherein the identification signals obtained by said obtaining unit are communication addresses provided to the plurality of signal sources.

15. A display control device according to claim 1, wherein the identification signals obtained by said obtaining unit are identification numbers or communication addresses provided for an output mode of the plurality of signal sources.

16. A display control device according to claim 1, wherein the identification signals obtained by said obtaining unit are identification numbers or communication addresses provided for an output channel of the plurality of signal sources.

17. A display control device according to claim 1, wherein a notification by said notification unit is performed synchronously with a change in inputted pictures.

18. A display control device according to claim 1, wherein the identification signals obtained by said obtaining unit are identification numbers or communication addresses provided for the pictures.

19. A display control system for controlling a display to display, on a single screen, a plurality of pictures, which are from a respective plurality of signal sources connected to signal lines, wherein the plurality of pictures are displayed in a respective plurality of display windows on the screen, said system comprising a display control device that includes:
    an attributes information memory, which stores display attributes information for each of the plurality of display windows;
    an obtaining unit, which obtains identification signals relating to the plurality of pictures from the plurality of signal sources;
    a display selection information creating unit, which creates display selection information based on the obtained identification signals;
    a display selection unit, which appropriates each of the plurality of pictures to a respectively corresponding one of the plurality of display windows according to the created display selection information; and
    a notification unit which, for each of the plurality of signal sources, notifies that signal source of (i) the stored display attributes information and the created display selection information and (ii) information identifying the signal source,
    wherein each of the plurality of signal sources comprises a transmitting unit, which transmits a signal corresponding to a display window, based on the display attributes information and the display selection information notified by said notification unit, and
    wherein the plurality of signal sources are separate apparatuses.

20. A display control system according to claim 19, wherein the transmitting unit suppresses an amount of information of the picture signals, based on the display attributes information and the display selection information notified by said notification unit, and transmits the signal, whose amount of information has been suppressed.

21. A display control method of a display control device, for controlling a display to display, on a single screen, a plurality of pictures, which are from a respective plurality of signal sources connected to signal lines, wherein the plurality of pictures are displayed in a respective plurality of display windows on the screen, said method comprising the steps of:
(a) at the display control device:
(1) storing display attributes information for each of the plurality of display windows;
(2) obtaining identification signals relating to the plurality of pictures from the plurality of signals sources;
(3) creating display selection information based on the obtained identification information;
(4) appropriating each of the plurality of pictures to a respectively corresponding one of the plurality of display windows according to the created display selection information; and
(5) for each of the plurality of signal sources, notifying that signal source of (i) the stored display attributes information and the created display selection information and (ii) information identifying the signal source, and
(b) at each of the plurality of signal sources:
transmitting a signal corresponding to a display window, based on the display attributes information and the display selection information notified in said notifying step,
wherein the plurality of signal sources are separate apparatuses.

22. A computer-readable recording medium storing a program for implementing a method of a display control device, for controlling to display, on a single screen, a plurality of pictures, which are from a respective plurality of signal sources connected to signal lines, wherein the plurality of pictures are displayed in a respective plurality of display windows on the screen, the program comprising:
code for a storage step of storing display attributes information for each of the plurality of display windows;
code for an obtaining step of obtaining identification signals relating to the plurality of picture signals from the plurality of signal sources;
code for a creating step of creating display selection information based on the obtained identification information;
code for an appropriating step of appropriating each of the plurality of pictures to a respectively corresponding one of the plurality of display windows according to the created display selection information; and
code for a step of, for each of the plurality of signal sources, notifying that signal source of (i) the stored display attributes information and the created display selection information and (ii) information identifying the signal source,
wherein the plurality of signal sources are separate apparatuses.

* * * * *

UNITED STATES PATENT AND TRADEMARK OFFICE
CERTIFICATE OF CORRECTION

PATENT NO. : 7,180,511 B2 Page 1 of 1
APPLICATION NO. : 09/873293
DATED : February 20, 2007
INVENTOR(S) : Kazuyukmi Shigeta It is certified that error appears in the above-identified patent and that said Letters Patent is hereby corrected as shown below:

COLUMN 4:
Line 31, "HDD)can" should read --HDD) can--.

COLUMN 10:
Line 52, "signals" should read --signal--.

COLUMN 11:
Line 12, "be to changed" should read --to be changed--.
Line 15, "to be change" should read --to be changed--, and "the a user" should read
   --a user--.

COLUMN 18:
Line 20, "Reference numeral 250d" should not start a new paragraph.

COLUMN 19:
Line 37, "signals" should read --signal--.
Line 66, "the a user" should read --a user--.

Signed and Sealed this

Twenty-third Day of October, 2007

JON W. DUDAS
*Director of the United States Patent and Trademark Office*